(12) United States Patent
Leicht

(10) Patent No.: US 12,636,723 B2
(45) Date of Patent: May 26, 2026

(54) DEVICE AND METHOD FOR CONTROLLED HEAT TRANSFER, IN PARTICULAR TO WORKPIECES OF LARGE DIMENSIONS AND MASSES BY MEANS OF A CONDENSING LIQUID

(71) Applicant: Eva Maria Leicht, Ebermannstadt (DE)

(72) Inventor: Helmut Walter Leicht, Ebermannstadt (DE)

(73) Assignee: Eva Maria Leicht, Ebermannstadt (DE)

( * ) Notice: Subject to any disclaimer, the term of this patent is extended or adjusted under 35 U.S.C. 154(b) by 937 days.

(21) Appl. No.: 17/792,986

(22) PCT Filed: Jan. 14, 2021

(86) PCT No.: PCT/EP2021/050628
§ 371 (c)(1),
(2) Date: Jul. 14, 2022

(87) PCT Pub. No.: WO2021/144332
PCT Pub. Date: Jul. 22, 2021

(65) Prior Publication Data
US 2023/0064858 A1 Mar. 2, 2023

(30) Foreign Application Priority Data
Jan. 15, 2020 (EP) ..................................... 20151944

(51) Int. Cl.
*B23K 1/00* (2006.01)
*B23K 1/015* (2006.01)
(Continued)

(52) U.S. Cl.
CPC ................ *B23K 1/015* (2013.01); *B23K 3/04* (2013.01)

(58) Field of Classification Search
CPC ......... H01L 24/75; H01L 24/81; H01L 24/97; H01L 21/561; H01L 24/13; H01L 24/16;
(Continued)

(56) References Cited

U.S. PATENT DOCUMENTS 3,947,240 A * 3/1976 Pfahl, Jr. .............. B23K 35/386
165/104.19
4,032,033 A * 6/1977 Chu ........................ B23K 1/015
134/108
(Continued)

FOREIGN PATENT DOCUMENTS

CA 1073275 A * 3/1980 ............. B23K 1/015
CN 102459691 A * 5/2012 ............. B23K 1/015
(Continued)

OTHER PUBLICATIONS

International Search Report for International Application No. PCT/EP2021/050628, mailed Apr. 13, 2021 (13 pages).
(Continued)

*Primary Examiner* — Kiley S Stoner
(74) *Attorney, Agent, or Firm* — Kagan Binder, PLLC

(57) ABSTRACT

The present invention generally relates to a device, a system comprising a plurality of devices and a method for controlled heat transfer, in particular by means of a condensing liquid, to workpieces, and in particular for soldering items to be soldered in a vapor phase zone. The vapor formed when the items to be soldered are immersed in the vapor phase zone is discharged and recovered. The immersion of the items to be soldered in the vapor phase zone and the removal of the items to be soldered from the vapor phase zone is realised in a simple manner.

17 Claims, 3 Drawing Sheets

(51) Int. Cl.
  *B23K 3/00* (2006.01)
  *B23K 3/04* (2006.01)

(58) Field of Classification Search
  CPC . H01L 2224/13111; H01L 2224/13139; H01L
  2224/13147; H01L 2224/16227; H01L
  2224/75272; H01L 2224/75804; H01L
  2224/759; H01L 2224/7598; H01L
  2224/75984; H01L 2224/81024; H01L
  2224/81092; H01L 2224/81095; H01L
  2224/81211; H01L 2224/81395; H01L
  2224/81815; H01L 2224/81908; H01L
  2224/95092; H01L 2224/97; H01L
  2924/014; H01L 2924/20104; H01L
  2924/20105; H01L 2924/20106; H01L
  2224/75101; H01L 2224/75251; H01L
  2224/75824; H01L 2224/8121; H01L
  23/3121; H01L 2224/758; H01L
  2224/75981; B23K 1/0016; B23K 3/047;
  B23K 3/087; B23K 2101/40; B23K 3/00;
  B23K 3/04; B23K 3/08; B23K
  37/04–0452; B23K 1/008–015; B23K
  2101/36–42; H05K 3/3494
  USPC .............. 228/234.2, 49.5, 43, 179.1–180.22,
  228/218–221, 42
  See application file for complete search history.

(56) References Cited

U.S. PATENT DOCUMENTS

| | | | | |
|---|---|---|---|---|
| 4,077,467 A | * | 3/1978 | Spigarelli | B23K 1/015 |
| | | | | 134/107 |
| 4,187,974 A | * | 2/1980 | Mahajan | B23K 1/015 |
| | | | | 219/439 |
| 4,394,802 A | * | 7/1983 | Spigarelli | B23K 1/015 |
| | | | | 34/470 |
| 4,558,524 A | * | 12/1985 | Peck | H01L 21/67034 |
| | | | | 134/104.4 |
| 4,589,956 A | * | 5/1986 | Westby | B01D 5/0051 |
| | | | | 203/1 |
| 4,612,712 A | * | 9/1986 | Pescatore | B23K 1/015 |
| | | | | 228/180.1 |
| 4,809,443 A | * | 3/1989 | Mishina | H05K 3/3489 |
| | | | | 228/234.2 |
| 4,838,476 A | * | 6/1989 | Rahn | C23G 5/04 |
| | | | | 134/107 |
| 4,840,305 A | * | 6/1989 | Ankrom | B23K 3/06 |
| | | | | 228/180.1 |
| 5,514,414 A | * | 5/1996 | Gao | H05K 3/3489 |
| | | | | 118/724 |
| 5,542,596 A | * | 8/1996 | Cimbak | B23K 1/015 |
| | | | | 228/234.2 |
| 5,611,476 A | * | 3/1997 | Soderlund | B01D 53/002 |
| | | | | 228/43 |
| 6,382,500 B1 | * | 5/2002 | Master | H01L 24/75 |
| | | | | 228/19 |
| 2001/0030386 A1 | * | 10/2001 | Garidel | B23K 1/015 |
| | | | | 432/66 |
| 2009/0014503 A1 | | 1/2009 | Choi et al. | |
| 2009/0173771 A1 | * | 7/2009 | Weber | B23K 1/008 |
| | | | | 228/46 |
| 2010/0308103 A1 | * | 12/2010 | Chou | B23K 1/015 |
| | | | | 228/49.5 |
| 2011/0215483 A1 | * | 9/2011 | Zhang | B23K 1/008 |
| | | | | 257/E23.023 |
| 2013/0175323 A1 | * | 7/2013 | Zhang | B23K 1/206 |
| | | | | 228/4.1 |
| 2021/0046567 A1 | * | 2/2021 | Wild | B23K 1/015 |

FOREIGN PATENT DOCUMENTS

| | | | | | |
|---|---|---|---|---|---|
| CN | 111451592 A | * | 7/2020 | ............. | B23K 1/008 |
| DE | 102004031713 B3 | * | 12/2005 | ............. | B23K 3/08 |
| DE | 102005058739 A1 | * | 6/2007 | ............. | B23K 1/206 |
| DE | 102006025206 A1 | * | 12/2007 | ............. | B23K 1/015 |
| DE | 202009014591 U1 | * | 3/2010 | ........... | B23K 1/0016 |
| DE | 102009028865 A1 | | 3/2011 | | |
| DE | 102009049270 A1 | * | 4/2011 | ............. | B23K 1/015 |
| EP | 0106295 A1 | * | 4/1984 | | |
| EP | 0218391 A1 | * | 4/1987 | | |
| EP | 0326539 A1 | * | 8/1989 | | |
| EP | 0732982 B1 | * | 8/1997 | | |
| EP | 3851235 A1 | * | 7/2021 | ............. | B23K 1/015 |
| JP | 01166881 A | * | 6/1989 | ............. | B23K 1/015 |
| JP | H01150465 A | | 6/1989 | | |
| JP | 01202362 A | * | 8/1989 | ............. | B23K 1/015 |
| JP | 107273442 A | | 10/1995 | | |
| JP | H07273443 A | | 10/1995 | | |
| JP | 2019181544 A | * | 10/2019 | ........... | B23K 1/0016 |
| TW | 201110295 A | * | 3/2011 | .............. | B23K 3/04 |
| TW | 201428867 A | * | 7/2014 | ........... | B23K 3/0623 |
| WO | WO-2005087422 A1 | * | 9/2005 | ............. | B23K 1/015 |
| WO | WO-2010066002 A1 | * | 6/2010 | ............. | B23K 1/008 |
| WO | WO-2011024813 A1 | * | 3/2011 | ........... | B23K 1/0008 |
| WO | WO-2012035143 A1 | * | 3/2012 | .............. | F26B 21/14 |

OTHER PUBLICATIONS

E-Space net English Abstract and Translation for DE 102009028865 A1.

E-Space net English Abstract and Machine Translation for JP H01150465 A.

E-Space net English Abstract and Machine Translation for JP H07273442 A.

E-Space net English Abstract and Machine Translation for JP H07273443 A.

* cited by examiner

<u>Fig. 1</u>
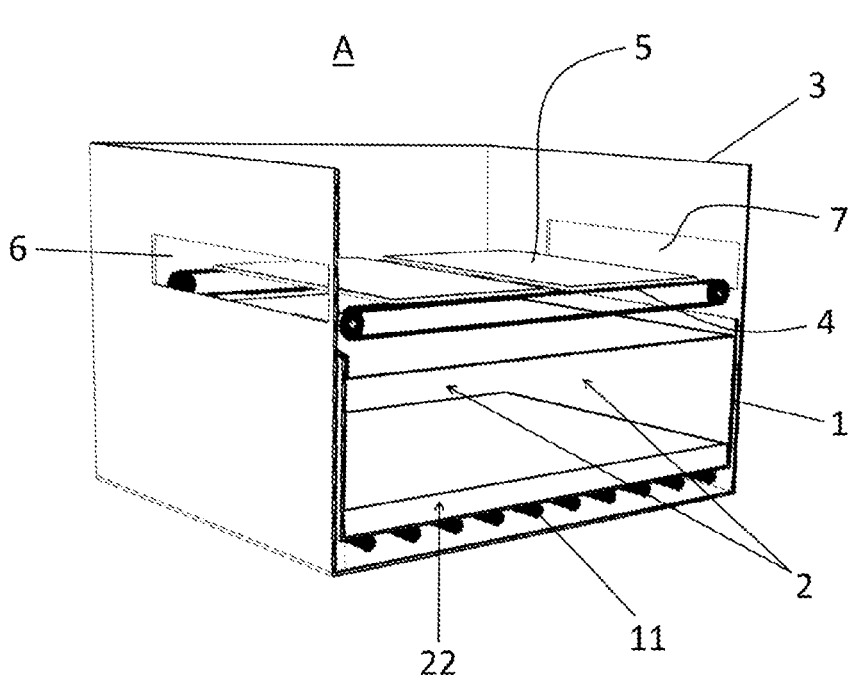
<u>Fig. 2</u>
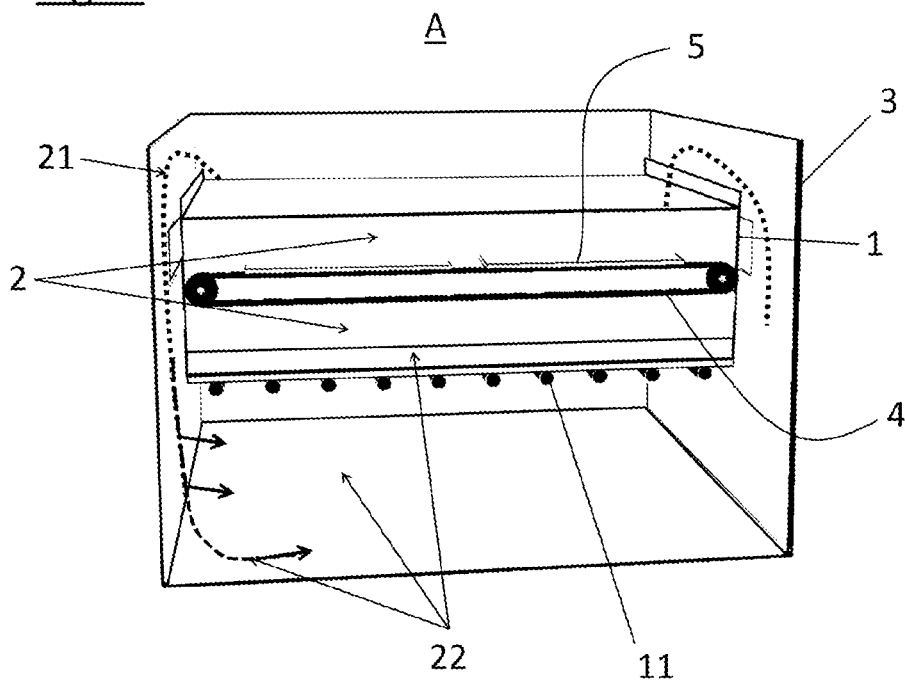

<u>Fig. 3</u>
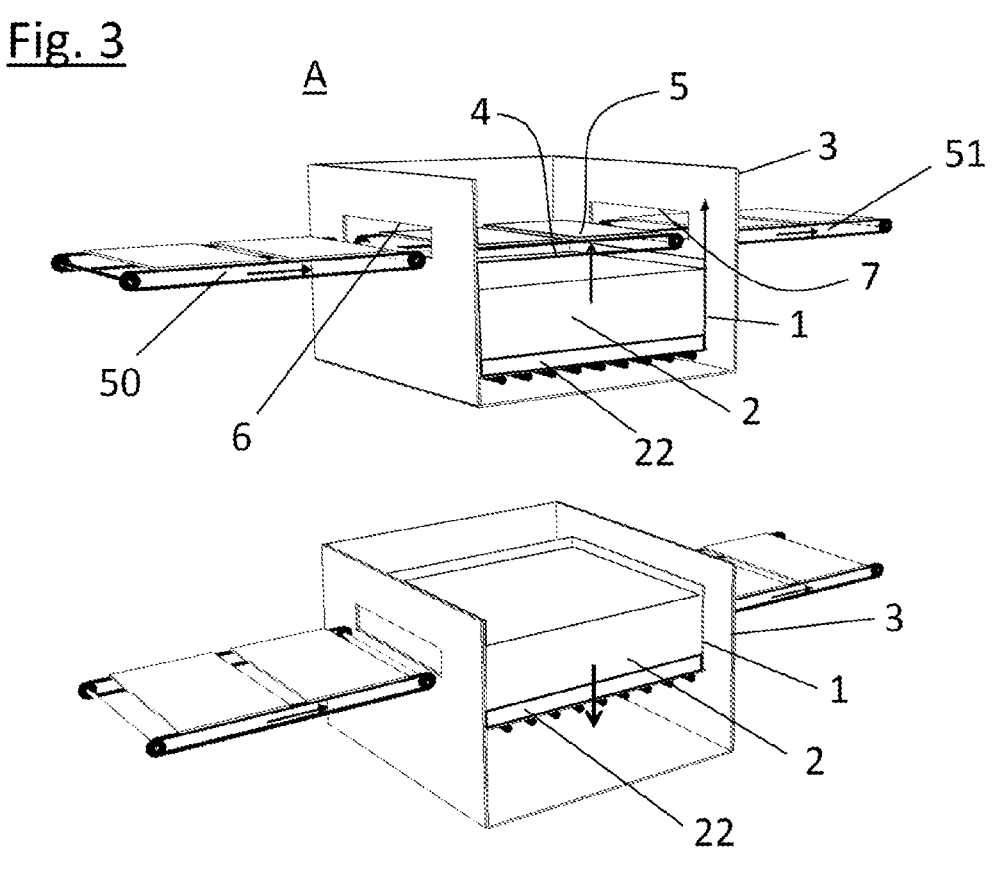
<u>Fig. 4</u>
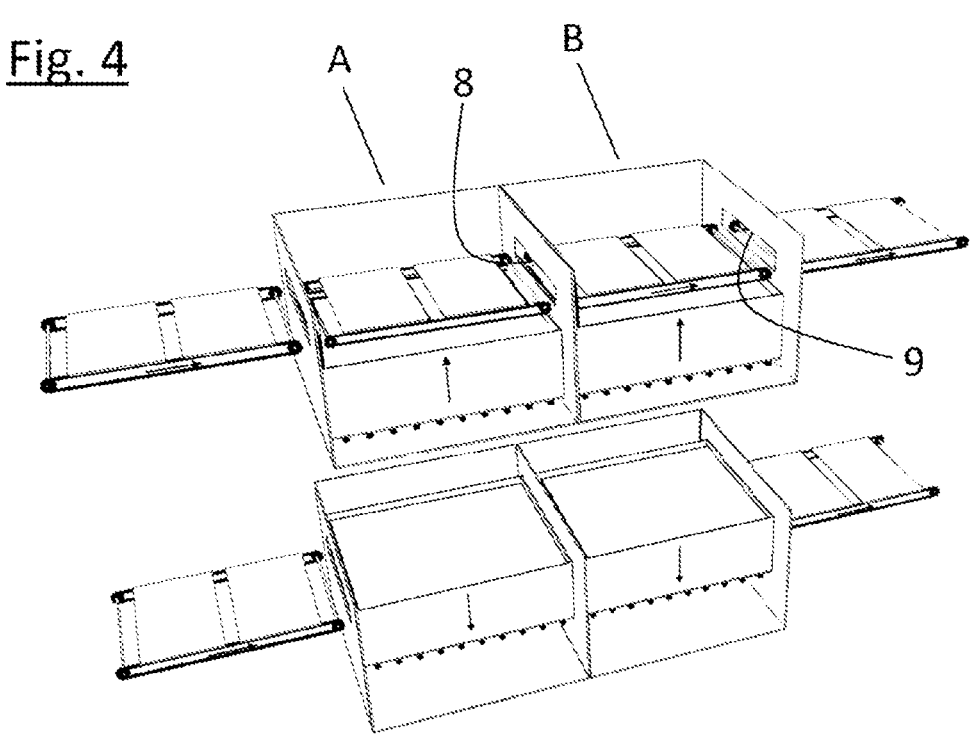

DEVICE AND METHOD FOR CONTROLLED HEAT TRANSFER, IN PARTICULAR TO WORKPIECES OF LARGE DIMENSIONS AND MASSES BY MEANS OF A CONDENSING LIQUID

CROSS-REFERENCE TO RELATED APPLICATIONS

This application claims priority to International Application No. PCT/EP2021/050628, filed Jan. 14, 2021 and titled "DEVICE AND METHOD FOR CONTROLLED HEAT TRANSFER, IN PARTICULAR TO WORKPIECES OF LARGE DIMENSIONS AND MASSES BY MEANS OF A CONDENSING LIQUID," which in turn claims priority from a European Patent Application having Ser. No. 20/151, 944.4, filed Jan. 15, 2020, both of which are incorporated herein by reference in their entireties.

FIELD OF THE INVENTION

The present invention relates to a device, a system comprising a plurality of devices and a method for controlled heat transfer, in particular to workpieces of large dimensions and masses by means of a condensing liquid. The invention is particularly suited for soldering items to be soldered in a vapor phase zone. Preferred are a device and a method for discharging and recovering vapor escaping the chamber in which the vapor phase zone is formed when the workpiece or item to be soldered is immersed in the vapor phase zone.

PRIOR ART

When items to be soldered are immersed in the vapor phase zone during vapor phase soldering, the vapor displaced by the items to be soldered and their mountings usually escapes the heated chamber in which the vapor phase zone is generated. Since the substances used to generate the vapor phase zone are expensive, this is disadvantageous. Minimizing losses due to the escape of vapor during vapor phase soldering is therefore desirable.

One possibility consists in using locks or raising the side walls of the heated chamber so as to prevent vapor displaced by the items to be soldered from escaping the heated chamber. This, however, involves the disadvantage that raising the side walls of the heated chamber lengthens the process of immersing the items to be soldered in the vapor phase zone on account of the greater distance to be covered to introduce the items to be soldered into the vapor phase zone. This has a negative effect on the throughput time of the items to be soldered in the overall process.

EP 0 629 148 B1 discloses a simple space-saving transport device for loading items to be soldered into and removing them from a vapor phase soldering equipment, wherein the items to be soldered are introduced into and removed from the vapor phase by a hinged support. The transport device comprises only one lock, which reduces the loss of vapor when the items to be soldered are introduced or removed. Introducing and removing the items to be soldered via a single lock, however, lengthens the throughput time of the items to be soldered in the manufacturing process. Moreover, the support of the item to be soldered requires quite complex kinematics. This transport device involves the particular disadvantage that large masses are moved by the movement of the support and the items to be soldered, which has a negative effect on the energy consumption of the overall process.

DE 199 11 887 C1 relates to a reflow soldering method in a vapor phase vacuum soldering equipment, wherein the item to be soldered, after being heated in a vapor phase, is transported to a vacuum chamber to remove solder voids. The vacuum chamber is located above the vapor phase zone within the vapor phase chamber. Therefore, the items to be soldered are first immersed in the vapor phase and then lifted to the vacuum chamber, which again requires a quite complex lifting device that may easily agitate the items to be soldered.

U.S. Pat. No. 4,321,031 relates to a multi-stage vapor soldering device, wherein vapor is fed onto the items to be soldered from above and heat is transferred to the items to be soldered upon contact. Vapor escaping the vapor chamber is transported back via transport gases and returned to the vapor chamber upon separation of the transport gases. However, introducing the vapor from above makes it hard to control the soldering temperature. This may have a negative effect on the quality of the items to be soldered due to an uneven temperature distribution.

It is therefore the object of the present invention to provide for a controlled heat transfer, in particular by means of a condensing liquid, to workpieces of large dimensions or masses. The present invention accelerates soldering in the vapor phase zone and in particular simplifies the immersion process of the items to be soldered in the vapor phase. The objective is a vibration-free process by avoiding lifting the items to be soldered. It is a further object of the present invention to discharge excess vapor escaping the vapor phase zone when the items to be soldered are immersed in the vapor phase zone and return any vapor condensate that may have formed to the heating or soldering process.

This object is achieved by the features of the independent claims. Preferred embodiments are disclosed in the dependent claims.

In the following, the invention will be explained in connection with soldering items to be soldered; however, the underlying principle within the scope of the present invention is generally applicable to the transfer of heat to workpieces using a condensing liquid.

BRIEF DESCRIPTION OF THE DRAWINGS

The invention will be explained in more detail with reference to the attached drawings, in which FIG. 1 shows a schematic view of the device according to the invention before immersion of the items to be soldered in the vapor phase zone;

FIG. 2 shows a schematic view of the device according to the invention upon immersion of the items to be soldered in the vapor phase zone;

FIG. 3 shows a schematic view of the device according to the invention as part of an inline manufacturing process;

FIG. 4 shows a schematic view of the system of the invention comprising two devices according to the invention arranged one after the other.

DETAILED DESCRIPTION OF THE INVENTION

Figure 5:
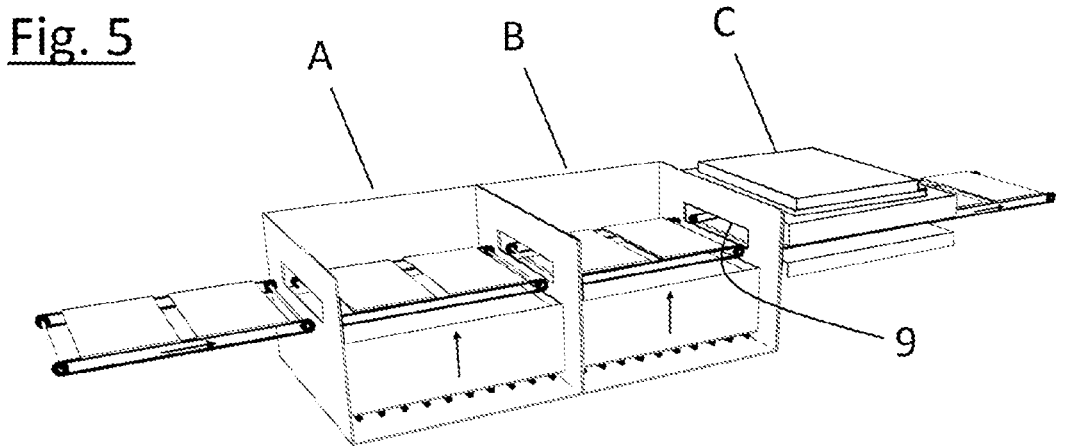
FIG. 5 shows a schematic view of the system according to the invention comprising two devices according to the invention and a vacuum chamber.

FIG. 1 shows a device A according to the invention for soldering item 5 to be soldered in a vapor phase zone 2 before the item 5 to be soldered is immersed in the vapor phase zone 2. The device A comprises a first chamber 1 and a second chamber 3. Preferably, the first chamber 1 and the second chamber 3 are open at the top. The first chamber 1 comprises a heater 11 for heating a fluid 22 which is supplied to the first chamber 1 so that a vapor phase zone 2 is formed in the upper part of the first chamber 1.

The second chamber 3 comprises at least one first lock 6 on one of its sides through which the item 5 to be soldered is introduced into the second chamber 3. Moreover, the second chamber 3 is provided with a transport and mounting device 4 on which the item 5 to be soldered is held in the second chamber 3. The lock 6 is preferably vertically positioned on a level with the mounting 4. Preferably, the second chamber 3 is moreover provided with a second lock 7. It is particularly preferred that the second lock 7 is positioned on a side of the second chamber 3 opposite the side on which the first lock 6 is provided.

The device A is further provided with a lifting device for moving the first chamber 1 vertically relative to the mounting 4 and thus immersing the item 5 to be soldered into the vapor phase zone 2 of the first chamber 1, as shown in FIG. 2. The first chamber 1 is thereby lifted by the lifting device to immerse the item 5 to be soldered in the vapor phase zone or lowered to remove the item 5 from the vapor phase zone 2. The mounting 4 preferably remains in its original vertical position within the second chamber 3. Alternatively, the lifting device may be designed such that it lifts or lowers the mounting 4 together with the item 5 to be soldered so as to immerse the item 5 to be soldered into the vapor phase zone 2 of the first chamber 1 or remove it therefrom.

The device A further comprises means for discharging vapor 21 that is displaced from the first chamber 1 when the item 5 to be soldered is immersed in the vapor phase zone 2 and escapes at the open upper side of the first chamber 1, as schematically shown in FIG. 2 by the dashed arrows. Preferably, the means has a closed loop configured to collect and return the discharged vapor 21 and optionally any vapor condensate 22 formed to the first chamber 1.

FIG. 3 schematically shows device A according to the invention as part of an inline manufacturing process according to the present invention. The item 5 to be soldered is transferred by a first conveyor belt 50 to the first lock 6 of the second chamber 3 and positioned on the mounting 4. As shown by the vertical arrows in FIG. 3, heat is transferred by lifting the first chamber 1, whereby the item 5 to be soldered is immersed into the vapor phase zone 2. The mounting 4 preferably remains horizontal or tilted in its vertical position within the second chamber 3. After heat transfer, the item 5 to be soldered is transferred from the mounting 4 via the second lock 7 to a second conveyor belt 51 for further processing and optionally transported to further manufacturing means.

As shown in FIG. 4, the present invention further relates to a system for soldering item 5 to be soldered in a vapor phase zone 2, comprising at least one first device A and at least one second device B arranged one after the other along a transport direction of the item 5 to be soldered (indicated by the arrows from left to right). The second device B of the system and the above-described first device A are preferably identically constructed. In the transport direction of the item 5 to be soldered, the system may have further, optionally identically constructed devices.

The first device A of the system is connected to the second device B via a lock 8. The item 5 to be soldered is introduced into the first device A of the system via the first lock 6 of the device A and positioned on the mounting 4. The first device A is configured to preheat the item 5 to be soldered by immersing it in the vapor phase zone 2. The preheated item

5 to be soldered is transported via the lock 8 into the second device B, where it is soldered by immersion in a vapor phase zone 2 of the device B, as described above.

As shown in FIG. 5, the system may further comprise a third device C, which is arranged downstream of the second device B the in the transport direction of the item 5 to be soldered and is configured to remove unwanted gaseous material from the solder of the item 5 to be soldered by generating a vacuum. The third device C is connected to the second device B via a further lock 9.

The present invention further relates to a method for soldering an item 5 to be soldered in a vapor phase zone 2 using a device A according to the present invention. In a first method step, the item 5 to be soldered is introduced into the second chamber 3 of the device A through the first lock 6 and positioned on the mounting 4. The item 5 to be soldered is then immersed in the vapor phase zone 2 of the first chamber 1, which is preferably achieved by lifting the first chamber 1 of the device A so that the vapor phase in the vapor phase zone 2 of the first chamber 1 surrounds the item 5 to be soldered. The item 5 to be soldered is held in the vapor phase zone 2 until the solder of the item 5 to be soldered melts and the actual soldering process takes place. The item 5 to be soldered is then removed from the vapor phase zone 2 preferably by lowering the first chamber 1 relative to the mounting 4, whereupon the item 5 is removed from the chamber 3 either through the first lock 6 or the second lock 7.

The vapor 21 displaced when the item 5 to be soldered is immersed in the vapor phase zone 2 is discharged. The discharged vapor 21 and/or any vapor condensate 22 formed is/are preferably returned to the first chamber 1 (not shown).

The present invention further relates to a method for soldering an item 5 to be soldered in a vapor phase zone 2 via a system that comprises, as described above, at least two devices A and B. The individual method steps in devices A and B correspond to the method steps described above. The temperatures of the vapor phase zone 2 of the device A and the vapor phase zone 2 of the vapor phase zone B may differ so that the item 5 to be soldered is merely preheated but not soldered when immersed in the vapor phase zone 2 of the device A. Alternatively, the vapor phase zone 2 of the device A and the vapor phase zone 2 of the device B may have the same temperature, and preheating can be achieved by reducing the dwell time of the item 5 to be soldered in the vapor phase zone 2 of the device A.

After being preheated in the device A, the item 5 to be soldered is transferred through the lock 8 into the second device B where the actual soldering process takes place. As described above, the item 5 to be soldered is to this end immersed in the vapor phase zone 2 of the second device B, where it is held for a certain period of time until the solder is molten before being removed through a further lock 9 from the device B.

Moreover, the present invention relates to a method of soldering an item 5 to be soldered in a vapor phase zone 2 by means of a system comprising at least two devices A and B as well as a third device C. The item 5 to be soldered is introduced from the device B into the device C through the lock 9. Unwanted gaseous material is removed from the hot solder of the items 5 to be soldered by generation of a vacuum in the third device C.

With the features of the device according to the present invention, the system according to the present invention and the method according to the present invention, the items to be soldered may be transported more easily within the device or the system, which has a positive effect on the throughput time of the items to be soldered in the soldering process. Furthermore, according to the device, the system and the method of the present invention, very large items may be soldered in a vapor phase zone, since it is not necessary for the items to be soldered themselves to be moved when being immersed in the vapor phase zone.

A further significant advantage over the prior art is that the workpiece is not moved during heat transfer and yet optimum temperature control is possible.

By avoiding lifting movements of the workpiece or the item to be soldered, a vibration-free heat treatment or soldering is ensured while at the same the heat transfer is controlled and regulated by lifting and lowering the liquid tank, so that the amount of condensing vapor may be changed in a very uniform and controllable manner.

With the present invention, it is moreover possible to discharge the vapor escaping the heated chamber of the device when the items to be soldered are immersed in the vapor phase zone. The discharged vapor and/or the resulting vapor condensate may be returned to the heated chamber so that less substances that are necessary for generating the vapor phase get lost.

The invention claimed is:

1. A device for heat treating a workpiece in a vapor phase zone, comprising:
    (a) a first chamber open at the top and provided with a heater, which comprises the vapor phase zone,
    (b) a second chamber comprising a bottom and side walls, which surrounds the first chamber and is provided with a mounting for the workpiece, and
    (c) a lifting device for lifting and lowering the first chamber in the second chamber and immersing the workpiece in the vapor phase zone when lifting the first chamber,
    further comprising:
        means for discharging the vapor escaping the first chamber through the upper opening, and
        means for returning the discharged vapor or vapor condensate to the first chamber,
    wherein a fluid flow space is provided between one of the side walls of the second chamber and the first chamber when in the lifted position to facilitate the discharging of the vapor escaping the first chamber and the returning the discharged vapor to the first chamber.

2. The device according to claim 1, wherein the second chamber comprises at least one first lock on one of the second chamber side walls for introducing the workpiece into the second chamber.

3. The device according to claim 2, wherein the mounting is positioned in the second chamber at the level of the first lock.

4. The device according to claim 2, comprising a second lock.

5. The device according to claim 4, wherein the second lock is positioned at the level of the first lock and/or the mounting.

6. A system for heat treating a workpiece in a vapor phase zone, comprising two or more devices according to claim 1,
    wherein the second device is arranged downstream of the first device, in the transport direction of the workpiece, and both devices are connected to one another via a lock,
    wherein the first device is configured to preheat the workpiece, and
    wherein the second device is configured to heat-treat the workpiece in the vapor phase zone.

7. The system according to claim 6, comprising a third device that is arranged downstream of the second device in the transport direction of the workpiece and is configured to remove unwanted gaseous material from the workpiece by generating a vacuum.

8. A method for heat treating a workpiece in a vapor phase zone by means of a device according claim 1, comprising the following steps:
    a) introducing the workpiece in the second chamber,
    b) positioning the workpiece on the mounting,
    c) immersing the workpiece in the vapor phase zone,
    d) holding the workpiece in the vapor phase zone,
    e) removing the workpiece from the vapor phase zone,
    f) removing the workpiece from the second chamber,
    g) discharging the vapor displaced from the first chamber when the workpiece is immersed in the vapor phase zone, and
    h) returning the discharged vapor and/or any vapor condensate formed therefrom to the first chamber.

9. The method according to claim 8, wherein the first chamber is vertically lifted relative to the mounting of the second chamber so as to immerse the workpiece in the vapor phase zone and wherein the first chamber is vertically lowered relative to the mounting of the second chamber so as to remove the workpiece from the vapor phase zone.

10. The method according to claim 8, wherein the workpiece is removed from the second chamber through the first lock or the second lock of the second chamber.

11. The method according to claim 8, wherein the workpiece is removed from the second chamber of the first device and is introduced in the second chamber of the second chamber through the lock between the first device and the second device.

12. The method according to claim 8, comprising the following steps:
    i) introducing the workpiece in the third device, and
    j) generating a vacuum in the third device so as to remove unwanted gaseous material from the workpiece.

13. The device according to claim 4, wherein the second lock is positioned at a side wall of the second chamber opposite the second chamber side wall comprising the first lock.

14. The system according to claim 6, wherein the first device is configured to preheat the workpiece in a temperature-controlled manner and/or the second device is configured to heat-treat the workpiece in the vapor phase zone in a temperature-controlled manner.

15. The method for heat treating a workpiece in a vapor phase zone by means of a system according claim 6, comprising the following steps:
    a) introducing the workpiece in the second chamber,
    b) positioning the workpiece on the mounting,
    c) immersing the workpiece in the vapor phase zone,
    d) holding the workpiece in the vapor phase zone,
    e) removing the workpiece from the vapor phase zone,
    f) removing the workpiece from the second chamber, and
    g) discharging the vapor displaced from the first chamber when the workpiece is immersed in the vapor phase zone.

16. The method for heat treating a workpiece in a vapor phase zone by means of a system according claim 7, comprising the following steps:
    a) introducing the workpiece in the second chamber,
    b) positioning the workpiece on the mounting,
    c) immersing the workpiece in the vapor phase zone,
    d) holding the workpiece in the vapor phase zone,
    e) removing the workpiece from the vapor phase zone, f) removing the workpiece from the second chamber, g) discharging the vapor displaced from the first chamber when the workpiece is immersed in the vapor phase zone, and h) returning the discharged vapor and/or any vapor condensate formed therefrom to the first chamber.

17. The method of claim 8, wherein the method comprises soldering an item to be soldered.

\*　\*　\*　\*　\*